Figure 1:
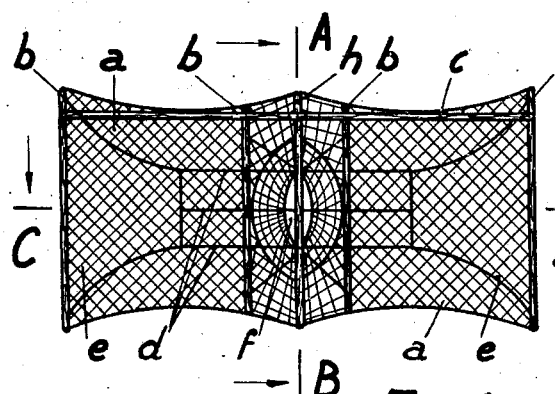

Sept. 18, 1928.  F. W. H. TOPPE  1,684,564

WEEL MADE OF NETTING

Filed March 3, 1927.

FRIEDRICH W. H. TOPPE by
Attorney

Patented Sept. 18, 1928.

1,684,564

UNITED STATES PATENT OFFICE.

FRIEDRICH WILHELM HEINRICH TOPPE, OF SCHWARTAU, NEAR LUBECK, GERMANY.

WEEL MADE OF NETTING.

Application filed March 3, 1927, Serial No. 172,343, and in Germany March 4, 1926.

This invention relates to weels or tubular fish and eel catching devices made of netting. Within each end opening of this device is secured a funnel-shaped net projecting into its interior and forming an inlet for the fish and eels. The inner rims of the said funnel-shaped inlet-nets are connected to each other by stretching cords which keep the said inlet-nets stretched and the inner openings of these inlet-nets open for the passage of fish when the weel is in opened out or in stretched position.

With a device of this well known type, it is only possible to catch fish which move in the longitudinal direction of the device, the fish entering through the said two end inlet-nets. Fish which move transversely of the device come into contact with its longitudinal closed net wall, turn to one or the other end of the device, and escape along the outer surface of the net wall longitudinally of the device.

In order to make it possible also to catch any fish swimming transversely of the tubular device when set in position, there are provided, according to the invention, in the longitudinal side walls of the device lateral openings also to which are fixed inwardly directed funnel-shaped inlet-nets. Stretching cords, co-operating with one or more central transverse hoops of the device, keep the inner openings of these lateral inlet-nets open so that the fish coming from the sides, can also pass into the device through the said lateral inlets.

In order, however, to make it possible also to catch any fish which strike the longitudinal side wall of the tubular net-body at places lying on the right or on the left of a lateral inlet-net, there is provided approximately in the vertical central plane of the two lateral inlets a central oval or kidney-shaped transversely arranged hoop. Into the portions of this hoop which project laterally outward beyond the outer openings of the lateral inlets are inserted nettings to form tongues or guide-nets. These projecting fish-guides stop the fish coming from the right or left along the longitudinal sides of the weel or tubular net-body and prevent them from passing over the entrances of the lateral inlet-nets, diverting them into the lateral entrance in question and therefore into the tubular net-body. Owing to the lateral projecting guide-nets some of the fish which are going in the longitudinal direction of the tubular net-body, but more or less laterally outside the end inlets, are also stopped and guided into the lateral inlets and therefore into the weel or net-body.

The arrangement of the lateral inlets in the net-body is, of course, made in such a manner that the catching of fish is in no way interfered with or disturbed. The possibility of catching as many fish from the sides as from the ends, is therefore ensured by the new device.

I am aware that devices having entrances at different sides are already known, which entrances lead between guide-nets towards a joint fish box and through the latter to a central container having a net-bag attached as a collector. Such a device is, however, at least a semi-rigid and very bulky construction which cannot be packed flat and reduced to a minimum size like the device according to this invention.

A construction of a device according to this invention is shown, by way of example, in the accompanying drawing.

Figure 2:
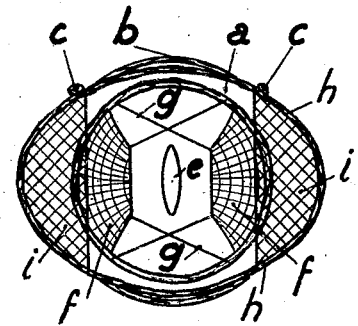
Figure 3:
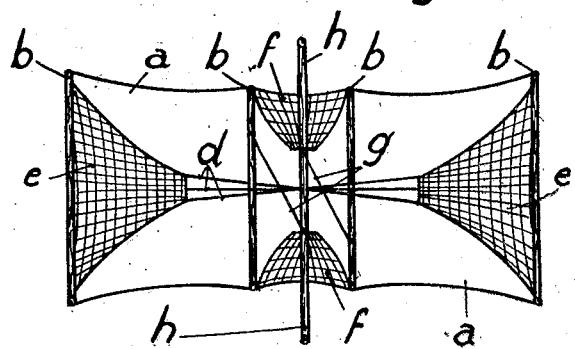
Figure 4:
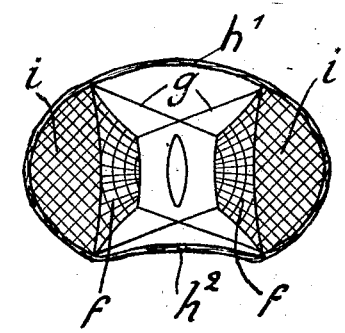
Figure 5:
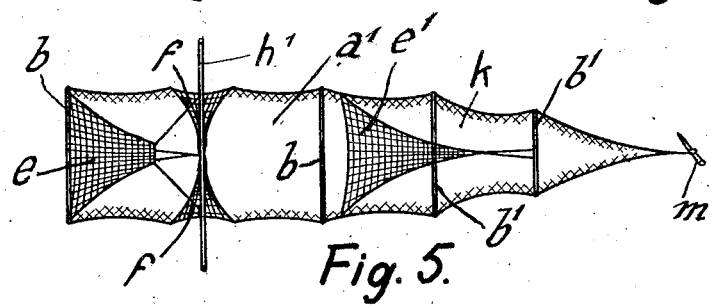

Figure 1 shows the improved weel or tubular catching device in side elevation in position for use. Figure 2 is a vertical section on the line A—B. Figure 3 is a horizontal section on the line C—D of Figure 1. Figure 4 is a cross sectional view of a tubular catching device having one single central hoop of kidney-shaped form only. Figure 5 is a plan view of a modified form of a tubular catching device especially adapted for taking eels, on a smaller scale.

Similar letters of reference refer to similar parts throughout the several views.

The tubular net-body $a$ of the device is held in the desired shape in any suitable manner, preferably by means of four transversely arranged hoops $b$ and two stretching rods $c$, the thereby stretched cords $d$ keeping the end inlet-nets $e$ also stretched and open. Between the two intermediate hoops $b$ on opposite longitudinal sides of the net-body are provided openings to which are fixed inwardly directed funnel-shaped inlet-nets $f$ which are kept taut and open by the stretched connecting cords $g$. Between the two centrally disposed hoops, approximately in the vertical central plane of the two lateral inlet-nets $f$ is further arranged an oval transversely situated hoop $h$. The portions of this hoop which project laterally outward beyond the longitudinal sides of the net-body are lined with nettings adapted to form guide-nets $i$.

Experiments carried out with various constructions of the improved device have shown that the two centrally disposed hoops $b$ could also be dispensed with, as one centrally situated hoop $h$ alone is sufficient to ensure the desired round or tubular shape to the net-body $a$, as well as to keep the lateral inlet-nets $f$ and the guide-nets $i$ in correct position, more particularly if a hoop $h^1$ (Fig. 4) is applied which in addition to its laterally projecting rounding-outs is provided with a slight rounding-in or reentering curvature $h^2$ in its lower or bottom part.

In the modification represented by Figure 5 and especially adapted for entrapping eels, a bag $k$ of network is attached to one of the end openings of the tubular net-body $a^1$, the said bag being provided with hoops $b^1$. The end inlet-net $e^1$ of this end opening does not lead into the interior of the net-body $a^1$ but runs outward into the said bag serving as a collecting container for the entrapped eels. The point of the net-bag is provided with suitable well known means for opening and discharging it. By means of a pole or bar $m$ the point of the bag $k$ is attached to the bottom of the water and the weel thus held in proper catching position.

The shape and dimensions, as well as the construction of the new device and of its single parts may be changed as desired according to fancy or requirements.

I claim:

1. A fish and eel trap comprising a tubular net body having end and lateral wall openings, hoops arranged transversely of the body for maintaining the openings in said body at the proper extension, funnel-shaped inlet nets at the end and lateral openings of said body, stretching rods fastened to said hoops for maintaining the net body in an open position, an oval hoop projecting beyond the sides of the net body, and guide nets fastened to said oval hoop.

2. A fish and eel trap made wholly of netting comprising a tubular net body having end and diametrically opposed lateral wall openings, hoops arranged transversely of the body for maintaining the openings in said body in extended position, funnel-shaped inlet nets at the end and lateral openings of said body, an oval hoop projecting beyond the sides of the net body from the central point thereof and transversely thereto, guide nets fastened to said oval hoop, and stretching cords for maintaining said inlet nets in an open position.

3. A fish and eel trap made wholly of netting comprising a tubular net body having end and diametrically opposed lateral wall openings, hoops arranged transversely of the body for maintaining the openings in said body at the extended position, funnel-shaped inlet nets at the end and lateral openings of said body, an oval hoop projecting beyond the sides of said end body and disposed centrally of said lateral wall openings and transversely to the net body, said central hoop having a reentrant portion upon the lower side thereof.

4. A fish and eel trap made wholly of netting comprising a tubular net body having end and lateral wall openings, funnel-shaped inlet nets at said end and lateral openings, hoops arranged transversely of the body for maintaining the openings in the body at the proper extended position, an oval hoop projecting beyond the sides of said body from the central point of said lateral wall openings and transversely thereto, guide nets fastened to said oval hoop, and a funnel net disposed within said net body, a network bag adapted to close one end of said net, said bag being supported by transversely disposed hoops, and means for discharging said bag.

FRIEDRICH WILHELM HEINRICH TOPPE.